(12) United States Patent
Feng et al.

(10) Patent No.: US 9,560,246 B2
(45) Date of Patent: Jan. 31, 2017

(54) DISPLACEMENT MONITORING SYSTEM HAVING VIBRATION CANCELLATION CAPABILITIES

(71) Applicant: The Trustees of Columbia University in the City of New York, New York, NY (US)

(72) Inventors: Maria Q. Feng, New York, NY (US); Yoshio Fukuda, Astoria, NY (US); Masato Mizuta, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 404 days.

(21) Appl. No.: 14/105,738

(22) Filed: Dec. 13, 2013

(65) Prior Publication Data
US 2014/0168422 A1    Jun. 19, 2014

Related U.S. Application Data

(60) Provisional application No. 61/737,465, filed on Dec. 14, 2012.

(51) Int. Cl.
*G01B 11/14* (2006.01)
*H04N 5/225* (2006.01)
*G01S 17/02* (2006.01)
*H04N 5/247* (2006.01)

(52) U.S. Cl.
CPC ........... *H04N 5/2252* (2013.01); *G01S 17/023* (2013.01); *H04N 5/247* (2013.01)

(58) Field of Classification Search
CPC ...... H04N 5/2252; H04N 5/247; G01S 17/023
USPC ........................................... 348/135; 382/106
See application file for complete search history.

(56) References Cited

U.S. PATENT DOCUMENTS

| | | | | |
|---|---|---|---|---|
| 6,618,439 B1* | 9/2003 | Kuo | ...................... | H04N 19/537 375/240.16 |
| 6,954,498 B1* | 10/2005 | Lipton | ............... | G06K 9/00771 348/E5.058 |
| 8,306,276 B2 | 11/2012 | Huang et al. | | |
| 2001/0055063 A1* | 12/2001 | Nagai | ..................... | G01S 11/12 348/116 |

(Continued)

FOREIGN PATENT DOCUMENTS

WO    2012145884    11/2012

OTHER PUBLICATIONS

Fukuda et al., "Cost-effective vision-based system for monitoring dynamic response of civil engineering structures", Structural Control and Health Monitoring, 17(8):918-936 (2010).

(Continued)

*Primary Examiner* — Christopher S Kelley
*Assistant Examiner* — Zhihan Zhou
(74) *Attorney, Agent, or Firm* — Baker Botts L.L.P.

(57) ABSTRACT

Techniques for vision-based sensing of structural displacement of an object, are disclosed. An example system includes digital video cameras adapted to generate digital image information corresponding to features of the object, an input to receive the digital image information corresponding to the one or more features, a converter configured to convert the digital image information into templates, and a comparator to compare the templates in sequence and to subtract displacement of stationary reference features.

13 Claims, 11 Drawing Sheets

(56) References Cited

U.S. PATENT DOCUMENTS

| | | | |
|---|---|---|---|
| 2005/0110875 A1* | 5/2005 | Ma | G06T 7/20 348/208.1 |
| 2006/0192946 A1* | 8/2006 | Walser | G01C 1/04 356/144 |
| 2008/0012850 A1* | 1/2008 | Keating, III | H04N 13/0207 345/419 |
| 2009/0226094 A1* | 9/2009 | Yamazaki | G06T 7/0044 382/190 |
| 2009/0285466 A1* | 11/2009 | Hipp | G06T 7/0014 382/131 |
| 2010/0111365 A1* | 5/2010 | Dixon | G01S 11/12 382/105 |
| 2010/0271199 A1 | 10/2010 | Belov et al. | |
| 2011/0176723 A1* | 7/2011 | Ali | G06T 7/2033 382/154 |

OTHER PUBLICATIONS

Lee et al., "Real-time displacement measurement of a flexible bridge using digital image processing techniques", Experimental Mechanics, 46:105-114 (2006).

Fukuda et al., "Vision-based displacement sensor for monitoring dynamic response using robust object search algorithm", IEEE Sensors Journal, 13(12):4725-4732 (2013).

\* cited by examiner

DISPLACEMENT MONITORING SYSTEM HAVING VIBRATION CANCELLATION CAPABILITIES

CROSS-REFERENCE TO RELATED APPLICATIONS

This application claims priority to U.S. Provisional Application No. 61/737,465, filed on Dec. 14, 2012, which is hereby incorporated by reference in its entirety.

BACKGROUND

Civil engineering structures can be exposed to various loads such as traffic, earthquakes and wind. Monitoring structural response, such as displacement or deflections, to such dynamic loads can play an important role in assessing the ongoing structural health of the structures and preventing structural failure.

Contact-type sensors, such as linear variable differential transformers, can be employed for measuring structural displacements. However, this can necessitate installation and cabling between the measurement point of the structure and a stationary platform, which can be difficult, and/or impracticable, for a large-size structure in the field. Accelerometers, which do not require a stationary reference point, can also be used to measure displacements through double integration of acceleration, but numerical errors can arise as a concern, and sensor installation and cabling can also be problematic for such systems.

Displacement monitoring by video image processing with so-called vision-based displacement sensors can be used as an alternative. Such systems can employ a digital camcorder and a personal computer to remotely monitor structural displacement. Certain systems, however, have required installation of a target on the structure of interest having a high contrast black-and-white pattern. Such installation can be costly and burdensome, and the targets typically require weather protection for long-term monitoring.

Likewise, certain vision-based displacement sensors are also susceptible to measurement error caused by ambient or environmental displacement of the camera system due, for example, to ground vibrations caused by traffic or weather conditions. These concerns increase with increasing distance of the vision-based displacement sensor from the structure being monitored and the corresponding magnification of the image of the structure being monitored.

Accordingly, a need exists for an accurate low-cost vision displacement sensor that is easily installed and which tracks the displacement of existing features of a structure.

SUMMARY

The disclosed subject matter provides vision-based techniques for monitoring displacement of objects. The disclosed subject matter utilizes multipoint measurement techniques adapted for cancellation of sensor vibration, to accurately measure displacements and deflections of a structure, or a portion thereof, under dynamic and/or static loads without the need to install sensors or specially designed target markers to the structure. The disclosed subject matter can be used for temporary measurement or long-term monitoring of structural displacements and deflections of a structure.

In an exemplary arrangement, a system includes one or more cameras or other devices capable of taking, storing and/or transmitting digital images, which are coupled to one or more computing devices equipped with certain image-processing capabilities, such as software designed to implement digital image processing techniques described below. The camera(s) can be configured or installed in a location remote from the structure to be monitored, and aimed at certain existing features, such as edges and/or rivets, on the structure. Digital images captured by the camera(s) can be transmitted, wirelessly or otherwise, to the computing devices. In one example, preselected or pre-identified features in the transmitted images can be extracted and matched using a target tracking technique based on orientation of brightness of pixels to estimate similarity between two images.

The system can simultaneously measure multiple points of a target structure with a single camera, or multiple cameras connected to a computing device with time synchronization. Such multi-point measurement can also be used for cancellation of the video camera vibration by simultaneously measuring a stationary point and a target on the structure, using one camera or multiple cameras fixed on the same station (such as a tripod). This noise cancellation permits accurate measurement from a long distance, in which the camera vibration can easily interfere with the measured structural displacement because of magnification of the camera vibration by the distance.

The sensor system can further include an auto-calibration component, which can eliminate the need for physically accessing the measurement points for calibration purpose, enable speedy setup, and enhance stability for long-term monitoring. The auto-calibration can be implemented using a module using a laser distance meter and a precision auto-zooming mechanism. The module can measure the distance between the camera(s) used and a target on the structure. The measured distance information can be sent to the computer to automatically calculate the actual pixel width and height considering the zooming ratio of the camera. The auto-calibration can also be used to automatically adjust the focus of the camera(s) for long term high-performance monitoring.

The accompanying drawings, which are incorporated in and constitute part of this specification, are included to illustrate and provide a further understanding of the disclosed subject matter. Together with the description, the drawings serve to explain the principles of the disclosed subject matter.

Figure 1:
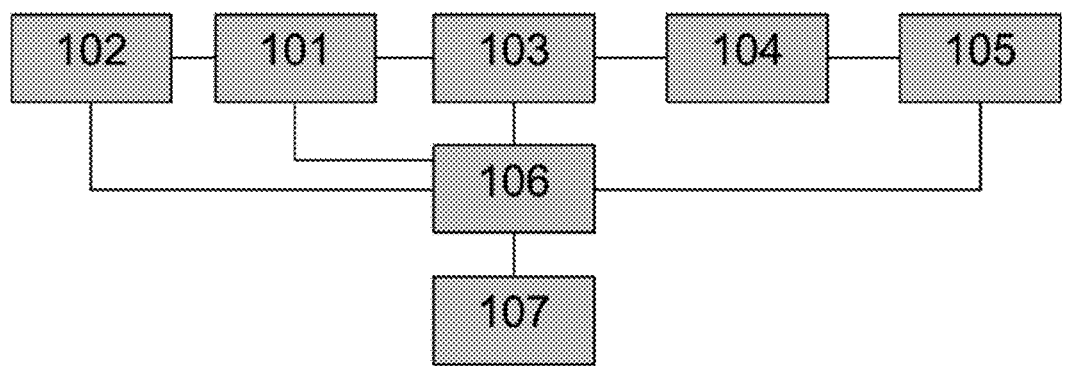
FIG. 1 depicts a schematic representation of a system in accordance with an exemplary embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the FIGs., it is done so in connection with the illustrative embodiments.

DETAILED DESCRIPTION

In accordance with one aspect of the disclosed subject matter, a system for measuring a structural displacement of an object using one or more digital video cameras adapted to generate digital image information corresponding to certain features of the object is provided. In certain embodiments, both a substantially stationary feature and at least one nonstationary feature of the object are observed.

As disclosed herein, an object subject to displacement monitoring can include any physical object, including without limitation civil engineering structures such as bridges, buildings, dams, rails, tunnels, highways, towers, parking structures, pipelines, and the like, as well as mobile structures such as machinery, equipment, centrifuges, vehicles, ships, and satellites, and objects within such structures. As disclosed herein, a "substantially stationary" feature of an object is a component of the object that is not predicted to exhibit displacement, whereas a "nonstationary" feature of an object is a component of the object that is predicted to exhibit displacement, such as a portion of the object that dynamically respond to external loads. As disclosed herein, "digital image information" refers to any recorded or transmitted digital images; reference is primarily made to digital video, but other forms of digital image information, including strobe or time-lapse photographic images, are also suitable for and contemplated by embodiments of the present disclosure.

FIG. 1 schematically depicts an exemplary system diagram in accordance with one embodiment of the present disclosure. As illustrated, the exemplary system includes a digital video camera 101 with a zoom (or "telescopic") lens 102, an input 103, a converter 104 coupled to the input 103, and a comparator 105 coupled to the converter 104. The exemplary system can further include an auto-calibrator 106 coupled to the comparator 105 and the camera 101 and/or the zoom lens 102, such as by an IEEE 1394b hub, a USB port, or a device with similar functionality. As depicted, the auto-calibrator is connected to a laser distance meter 107, such as, by way of example, a DLC Laser Distance Measuring Meter (PCE Instruments) or a Leica Disto Distancemeter series (Leica Geosystems) with RS232 or RS232 connection.

The convertor 104, the comparator 105, and the auto-calibrator 106 can be any appropriate hardware, firmware, or software running with one or more processing arrangements. In certain exemplary embodiments, and as discussed in detail below, the convertor 104 and the comparator 105 are software algorithms to generate orientation code representations of the digital images and to track displacement of the features in such representations, respectively. Such algorithms may include, by way of example, the Sum of Square Difference (SSD) algorithm, which refers the sum of the square of the brightness difference between two images, the Correlation Coefficient (CC) algorithm, which computes the brightness-based correlation coefficient between two images, and the OCM algorithm disclosed in Fukuda et al., "Vision-Based Displacement Sensor for Monitoring Dynamic Response Using Robust Object Search Algorithm," IEEE Sensors Journal, 13:12 (December, 2013), the disclosure of which is hereby incorporated by reference herein in its entirety.

The auto-calibrator 106 can be configured to auto-focus zoom lens 102, to receive as an input the zoom ratio of the zoom lens 102, to receive as an input the distance between the camera 101 and the target, and to calculate and output to the comparator the spatial dimensions corresponding to the size of the component pixels of the digital images.

In certain embodiments of the present disclosure, the digital image information from digital video camera 101 is received by convertor 104 via the input 103 in real time or substantially in real time. In alternative embodiments, the digital image information is temporarily stored, either at the digital video camera itself or remotely, before being received by convertor 104. In additional embodiments, the comparator also subtracts displacement of the at least one substantially stationary feature from the displacement observed for the at least one nonstationary feature to measure spatial displacement of the at least one nonstationary feature over time. For example, while measuring the displacement of the nonstationary features to monitor the characteristics of the target structure with one or more cameras, another camera measures the displacement of a stationary feature, such as the bedding of the structure. Displacement of the features observed due to camera vibration (due to, for example, ambient vibrations caused by wind and nearby road or rail traffic) rather than displacement of the nonstationary features (occurring as a result of, for example, dynamic response of the structure to an external load or force) will be observed for both the stationary and nonstationary features. Thus, by determining the difference between the displacement observed for the one or more nonstationary features and a stationary feature of the same structure, the noise in the measured displacement of the nonstationary features is cancelled. In certain embodiments in which multiple cameras generate synchronized digital image information, all cameras are mounted to a single stable camera mount, such as a tripod or a housing.

Figure 2:
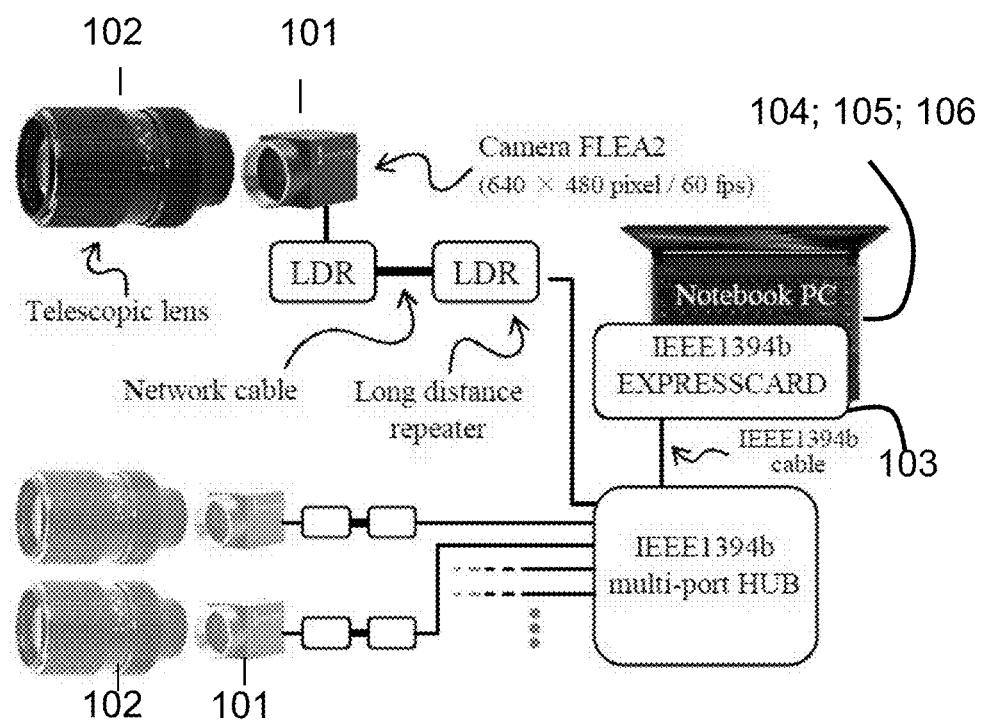
FIG. 2 depicts a schematic representation of a further system in accordance with an exemplary embodiment of the disclosed subject matter.

In the exemplary embodiment depicted in FIG. 2, the convertor 104, the comparator 105, and the auto-calibrator 106 are supported by a notebook computer connected to one or multiple video cameras 101 having a telescopic lens 102 and a sampling rate of, e.g., 30 to 150 frames per second. The video images corresponding to the target features can be digitized into, for example, 640×480 to 1280×1024 pixel with 8, 12, 16 and 24 bit greyscale images and streamed into a computer having, for example, a one-gigahertz CPU. As depicted, the input 103 can be an IEEE connection connected to a network cable via a long distance repeater through an IEEE connection and a network cable via a long distance repeater. The network cable and long distance repeater permit real-time displacement measuring with a distance between the computer and the at least one camera of 100 meters or more. Using an IEEE 1394b multi-port hub or a device with similar functionality, more than one camera 101 can be connected to and controlled by the auto-calibrator 106 simultaneously.

In certain embodiments of the disclosed subject matter, the convertor 104 and comparator 105 employ a template matching object search algorithm. In certain embodiments in which a template matching algorithm is employed, the template matching algorithm is an orientation code matching ("OCM") algorithm. The OCM algorithm compares gradient information from each pixel in the form of orientation codes rather than the input grey levels of the digital image information. According to one embodiment of the OCM algorithm, orientation code representations for an image are constructed from the corresponding greyscale images by assigning each pixel in the image an orientation code obtained by quantizing the orientation angle at the corresponding pixel position in the greyscale image. The orientation angle represents the steepest ascent orientation evaluated from each pixel neighborhood measured with respect to the horizontal axis. The orientation codes obtained are thus a function of the texture and shape of the objection and essentially invariant to object translation and the effects of shading and variations in illumination.

Figure 3A:
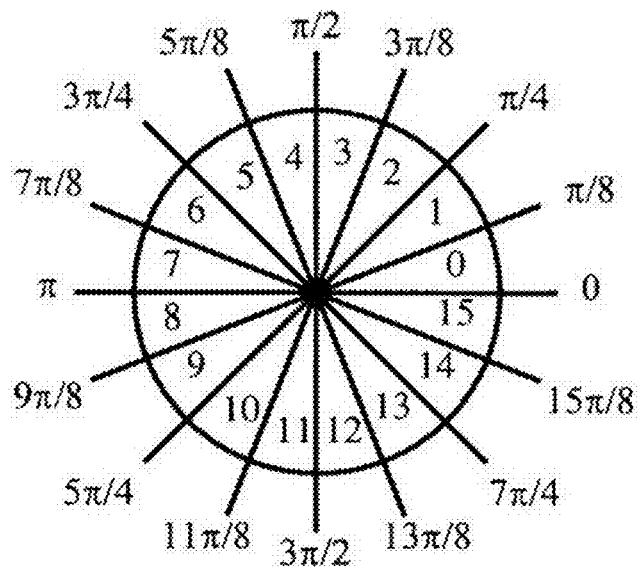
FIG. 3A depicts pixel orientation coding in accordance with an exemplary embodiment of the disclosed subject matter.

In one exemplary embodiment of the OCM algorithm, where an analog image is represented by I(x, y) and its horizontal and vertical derivatives represented by $$\nabla Ix = \frac{\partial I}{\partial x} \text{ and } \nabla Iy = \frac{\partial I}{\partial y}$$

respectively, the derivatives are evaluated around a pixel position (i, j). The orientation angles $\theta_{i,j}$ are then computed using the $\tan^{-1}$ function according to the formula $\theta_{i,j}=\tan^{-1}(\nabla Iy/\nabla Ix)$, the range of $\theta$ being $[0, 2\pi]$. The orientation codes corresponding to each $\tan^{-1}$ value are depicted in FIG. 3A.

The orientation code is obtained by quantizing $\theta_{i,j}$ into $N=(2\pi/\Delta_\theta)$ levels with a constant width $\Delta_\theta$. The code is defined as below using Gaussian notation:

$$C_{i,j} = \begin{cases} \left[\frac{\theta ij}{\Delta\theta}\right]: & |\nabla Ix| + |\nabla Iy| > \Gamma \\ N = \frac{2\pi}{\Delta\theta}: & \text{otherwise} \end{cases} \quad (1)$$

where $\Gamma$ is a large, pre-specified threshold value level for ignoring low contrast pixels and assigned a code for low contrast pixels. $\Gamma$ is used to prevent uniform regions from influencing error evaluation, as pixels with low contrast neighborhoods are sensitive to noise. Using too large a value of $\Gamma$ can cause suppression of information in low contrast images.

The best match between orientation code images of the template T and any object image I from the same image is determined by minimizing the sum of errors function according to the following formula:

$$D = \frac{1}{M} \sum_{Im,n} d(OIm, n(i, j), OT(i, j)) \quad (2)$$

where $O_{Im,n}$ and $O_T$ are the orientation code images of the subimage and the template, respectively, M is the size of the template, (m, n) shows the position of the sub image in the scene, and d(•) is the error function based on an absolute difference criterion:

$$d(a, b) = \begin{cases} \min[|a-b|, N-|a-b|], & \text{if } a \neq N \cap b \neq N \\ \frac{N}{4}, & \text{if } a \neq N \cap b = N \\ 0, & \text{otherwise} \end{cases} \quad (3)$$

Finally, the similarity ratio s is derived as follows:

$$h=D/(N/2) \quad (0 \leq h \leq 1)$$

$$s=1-h \quad (0 \leq s \leq 1) \quad (4)$$

where h is the discrimination ratio obtained by dividing the average absolute difference D by the maximum absolute difference N/2. To find the best matched point, at which the similarity reaches the maximum value, the template image should be compared with the entire target frame pixel by pixel.

In further embodiments, to reduce computation time, a region of interest can be defined based on estimated maximum movement of the target location from the current best-matched point based on frame rate (e.g., 16 ms for 60 fps), and OCM processing is carried out only within the region of interest. For example, if the target moves at a maximum speed of 300 mm per second and is monitored at a frame rate of 60 frames per second, the ROI must cover an area at least 5 mm (i.e. 300/60) wider the target area.

Figure 3B:
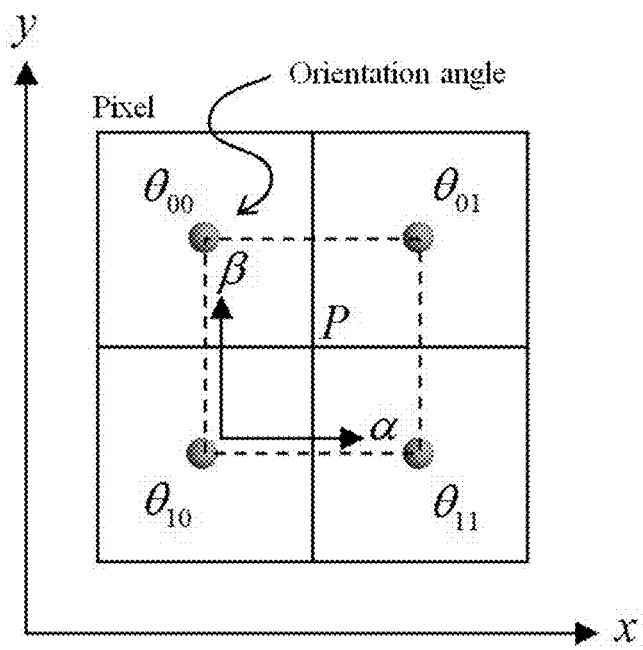
FIG. 3B depicts sub-pixel interpolation analysis in accordance with an exemplary embodiment of the disclosed subject matter.

In actual field operation, it can difficult to eliminate errors associated with the refractive index of air and the effect of atmospheric motion during image capturing. To reduce such errors, a large pixel area, such, for example, an area of 128 pixels×128 pixels, should be captured to perform template matching. This can be accomplished by the use of a telescopic lens with a short focal length and a high resolution image capture system, but these devices can multiply the cost of the system. Accordingly, in certain embodiments, a sub-pixel template matching algorithm is employed, such as, for example, a sub-pixel OCM algorithm. An exemplary OCM subpixel analysis algorithm is disclosed in greater detail in Fukuda et al., "Vision-Based Displacement Sensor for Monitoring Dynamic Response Using Robust Object Search Algorithm," IEEE Sensors Journal, 13:12 (December, 2013), the disclosure of which is incorporated by reference herein in its entirety. In certain embodiments of the sub-pixel OCM algorithm, sub-pixel resolution is achieved by interpolating orientation angle with a bilinear interpolations. As illustrated at FIG. 3B, the interpolated orientation angle θ is obtained in the sub-pixel OCM algorithm as follows:

$$\theta = \alpha(\beta\theta_{11} + (1-\beta)\theta_{10}) + (1-\alpha)(\beta\theta_{01} + (1-\beta)(\theta_{00}) \quad (5)$$

wherein $\theta_{00}$, $\theta_{01}$, $\theta_{10}$, and $\theta_{11}$ are the orientation angles surrounding grip point P. The relative coordinate ($\alpha$, $\beta$) represents the position in a sub-pixel resolution. The range of each axis is [0,1].

Figure 4:
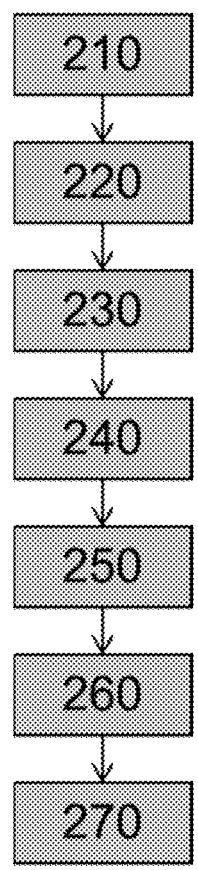
FIG. 4 is a flow chart of a process for measurement of structural displacement in accordance with an exemplary embodiment of the disclosed subject matter.

FIG. 4 schematically depicts an exemplary process according to the present disclosure. At 210, digital image information corresponding to one or more nonstationary features of the object at a frame rate is generated by, for example, one or more digital video cameras having a zoom lens. At 220, the digital image information is converted into a sequence of templates each corresponding to a frame of the digital image information. At 230, each template is compared to the previous template in the sequence to identify a displacement of the object. In 240, displacement observed due to camera vibration is subtracted, e.g., by subtracting displacement of the object observed in the template that does not correspond to spatial displacement of the features of the object. At 250, the distance between the camera and the object is measured, by, for example, a laser distance meter. At 260, the zooming ratio of the zoom lens of the one or more cameras is determined.

At 270, the spatial displacement of the one or more nonstationary features is calculated based on 250 and 260, as well as the pixel density of the digital image information generated at 210. For example, when a camera without a zoom lens is calibrated and its actual pixel width is Cx,y [m] at a distance of 1 m away, the actual pixel width Px,y [m] with a zoom lens will be calculated as follows:

$$P_{x,y} = \frac{D \cdot C_{x,y}}{R} \quad (6)$$

where R is the actual zoom ratio of the zoom lens, D [m] is the distance between the camera and the target measured by the laser distance meter.

In exemplary processes in which digital image information is generated by two or more cameras, the process can include synchronization prior to conversion step 220, where the digital image information generated by each camera is synchronized, e.g., by a digital timestamp. Synchronization of the disparate digital image information permits simultaneous observance of multiple features of a single object, thus permitting cancellation of noise (i.e., displacement of the object in the template that does not correspond to spatial displacement of the object). By fixing each camera to the same stable mounting structure or housing, cancellation (i.e., subtraction) of noise observed due to camera vibration can be achieved as described below. The process can also include a sub-pixel interpolation, where each orientation code in the digital image is interpolated to further reduce error.

The preceding processes are provided for purpose of illustration rather than limitation. The disclosed processes can use further or fewer procedures and can proceed in an order different from that indicated above. For example, process steps 250 to 270 may be performed prior to steps 210 to 240, or, where only relative displacement is of interest, process steps 250 to 270 may be omitted.

In a related aspect of the present disclosure, a method of measuring a structural displacement of one or more nonstationary target features of an object that includes subtracting displacement of one or more stationary reference features is disclosed. Such subtraction can effectively account for errors observed due to displacement of the one or more cameras rather than the nonstationary target features, due, for example, to camera vibration caused by ambient or environmental vibration.

In certain embodiments, the method includes generating digital image information corresponding to the one or more nonstationary target features of the object and one or more substantially stationary reference features of the object at a frame rate using, for example, one or more digital cameras. The method can further include analyzing the digital image information corresponding to the one or more nonstationary features and the digital image information corresponding to the one or more stationary features with the aid of the processor. In certain embodiments, the processor can be configured to convert the digital image information into orientation codes and to compare the orientation codes in sequence to determine displacement of the nonstationary features over time. The processor can further be configured to subtract displacement of the one or more substantially stationary reference features from displacement of the one or more nonstationary features. This displacement subtraction effectively compensates for and cancels vibration of the one or more cameras caused by ambient or environmental vibration.

In some embodiments, the camera vibration cancellation can be implemented with one camera configured to capture, in each image, both of (1) a target measurement point or area of the subject structure that dynamically respond to external loads and (2) a reference point or area corresponding to another portion of the subject structure (or an external object or structure) that is substantially stationary. The preselected features in the target measurement point or area can be identified, e.g., extracted and matched against a template by a template matching technique as described above, and its displacement relative to the reference point (which can be similarly processed by extracting and matching certain features contained therein with a corresponding template) can be determined as the actual displacement of the target measurement point.

Figure 5:
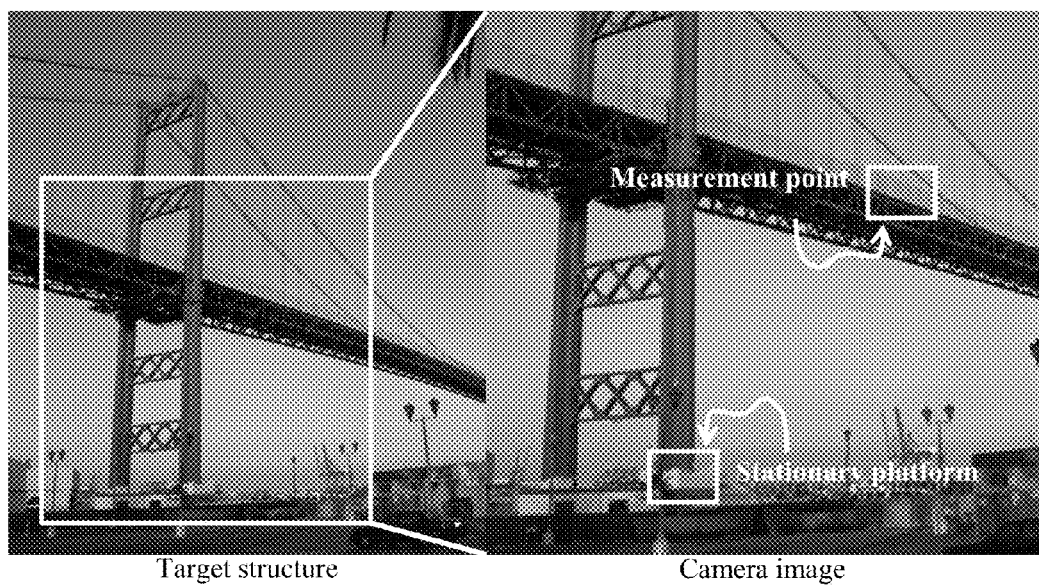
FIG. 5 depicts a single camera noise cancellation method in accordance with an exemplary embodiment of the disclosed subject matter.

For purpose of illustration, FIG. 5 shows an exemplary noise cancellation technique for camera vibration using multi-point measurement with a single video camera. As shown in FIG. 5, in a camera image that includes two measurement areas (marked as boxes), the base of the bridge column (which is considered stationary) can be selected as a reference measurement point or area. The relative displacement between this reference measurement point and the target measurement point on the bridge can be recorded as actual displacement.

In alternative embodiments, multiple cameras can be used for camera vibration cancellation. In such embodiments, a first camera can be aimed at and capture a target measurement point or area of the subject structure that dynamically respond to external loads, and a second camera (or the reference camera) can be installed on a same station, such as a tripod, and aimed at and capture a reference measurement point or area corresponding to another portion of the subject structure (or an external object or structure) that is substantially stationary. By mounting all the cameras onto one tripod or other mounting tools, the vibration noises can be considered as same vibrations, which cancel out amongst themselves. The images captured by the two cameras can be simultaneously transmitted to a computer for processing by techniques as described above. The relative displacement between the reference point and the target measurement point can be recorded as actual displacement of the target measurement point or area. The zooming ratio and camera direction of each camera can be adjusted to improve the accuracy of feature-extraction technique described above, thereby improving the overall measurement accuracy.

Figure 6:
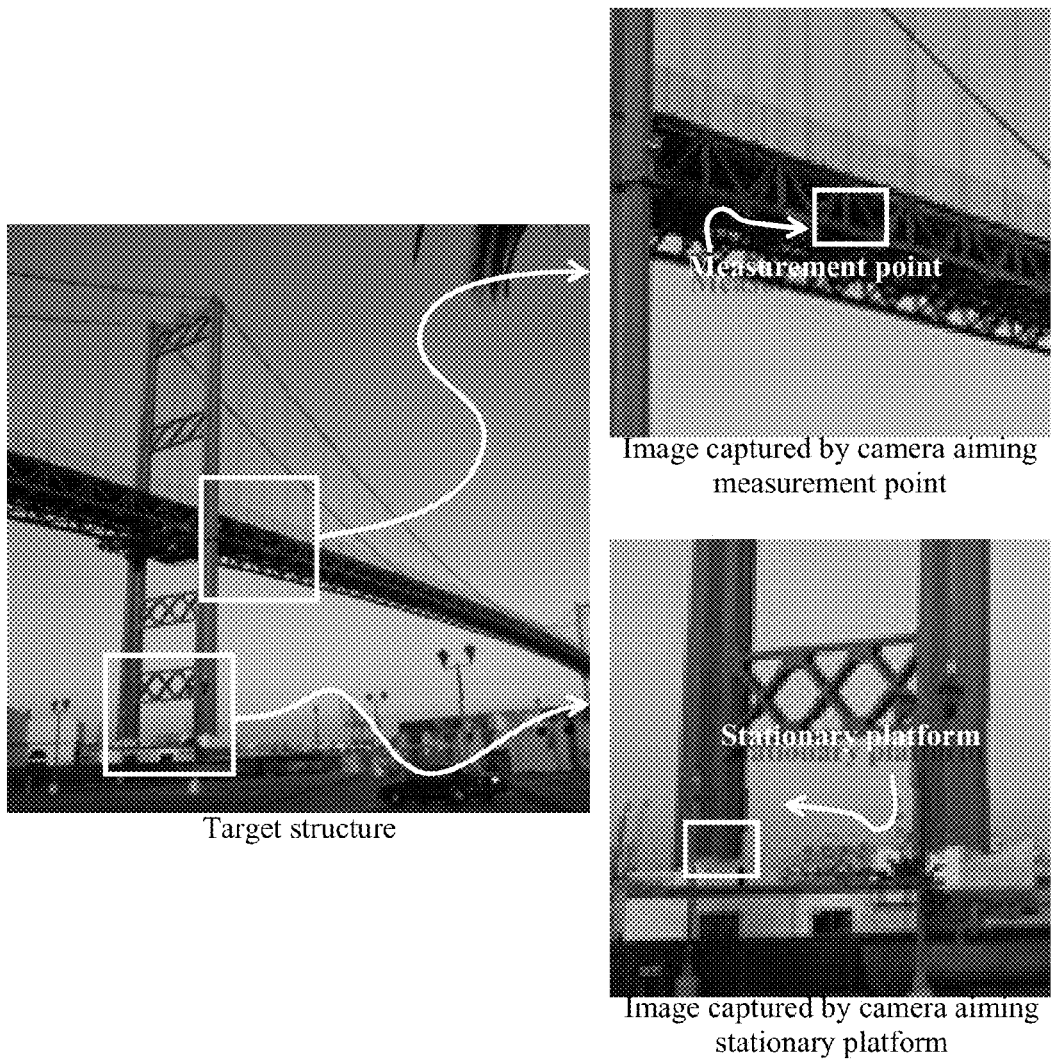
FIG. 6 depicts a multi-camera noise cancellation method in accordance with an exemplary embodiment of the disclosed subject matter.
Figure 7:
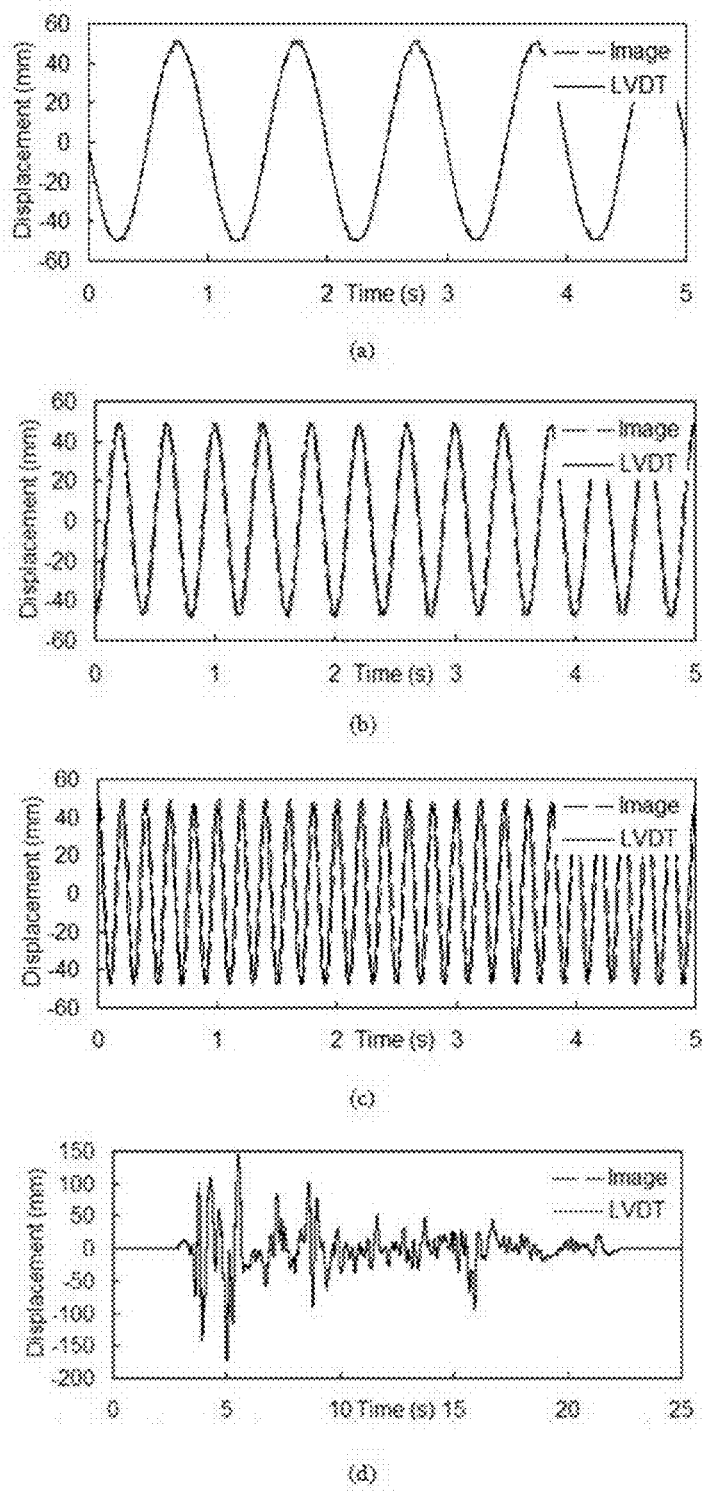
FIGS. 7A, 7B, 7C, and 7D are plots of displacement over time of an object vibrating at 1 Hz, 2.5 Hz, 5 Hz, and randomly, respectively, measurement of which was performed in accordance with an exemplary embodiment of the disclosed subject matter.

For illustration, FIG. 6 shows an exemplary noise cancellation technique using multiple video cameras connected to a computer. A first camera can be aimed at and capturing image information corresponding to the target measurement point on the bridge as shown, and a second camera aimed at and capturing image information corresponding to an area that includes the base platform of the bridge (considered stationary) as a reference point or area. The images acquired from each camera can be synchronously transmitted to the computer for processing, such as by using high speed communication interfaces, for example, IEEE1394 (FireWire) or USB 3.0 connection. The target and reference features of the structure are depicted in FIG. 6 as the Measurement Point and Stationary Platform respectively, and the boxes correspond to the areas analyzed during displacement measurement. By subtracting the difference between any displacements observed for the reference feature, i.e., the Stationary Platform, from displacement simultaneously observed for the target feature, i.e., the Measurement Point, noise due to, for example, motion of the camera station due to ambient or environmental vibration.

Although reference is primarily made to images corresponding to the visible spectrum of light, other wavelengths of light, such as infrared and ultraviolet light, are also suitable for and contemplated by aspects of the present disclosure.

EXAMPLES

Example 1

A predesigned black and white target panel having a height of 218 mm and a width of 280 mm was fixed to an electromagnetic shaking table. A digital video camera with a 75 mm lens was placed at a stationary position 5.5 meters away from the table. A linear variable differential transformer was installed between the shaking table and a stationary reference point for purpose of comparison.

The shaking table was operated at frequencies from 0.1 Hz to 5.0 Hz with a constant amplitude of 50.0 mm. Subsequently, the shaking table was driven by a recording of the ground motion of the 1995 Great Hanshin-Awaji earthquake. At each frequency, digital image information was collected by the camera for 60 seconds at a frame rate of 60 frames per second. Using the size of the target panel, the distance of the camera from the target panel, and the number of pixels of the digital video camera, pixel size was determined to be 0.54 mm/pixel, and the theoretical error of the OCM algorithm found to be 0.27 mm (i.e. half the length of a side of the pixel).

Target panel displacement was measured using the OCM algorithm described above. Recorded measurements for the 1 Hz, 2.5 Hz, 5 Hz, and earthquake recording experiments are shown in FIGS. 7A-7D, respectively. As illustrated, very close agreement was observed between displacement measured by the vision-based sensor with OCM analysis and by the linear variable differential transformer for each experimental run.

Figure 8:
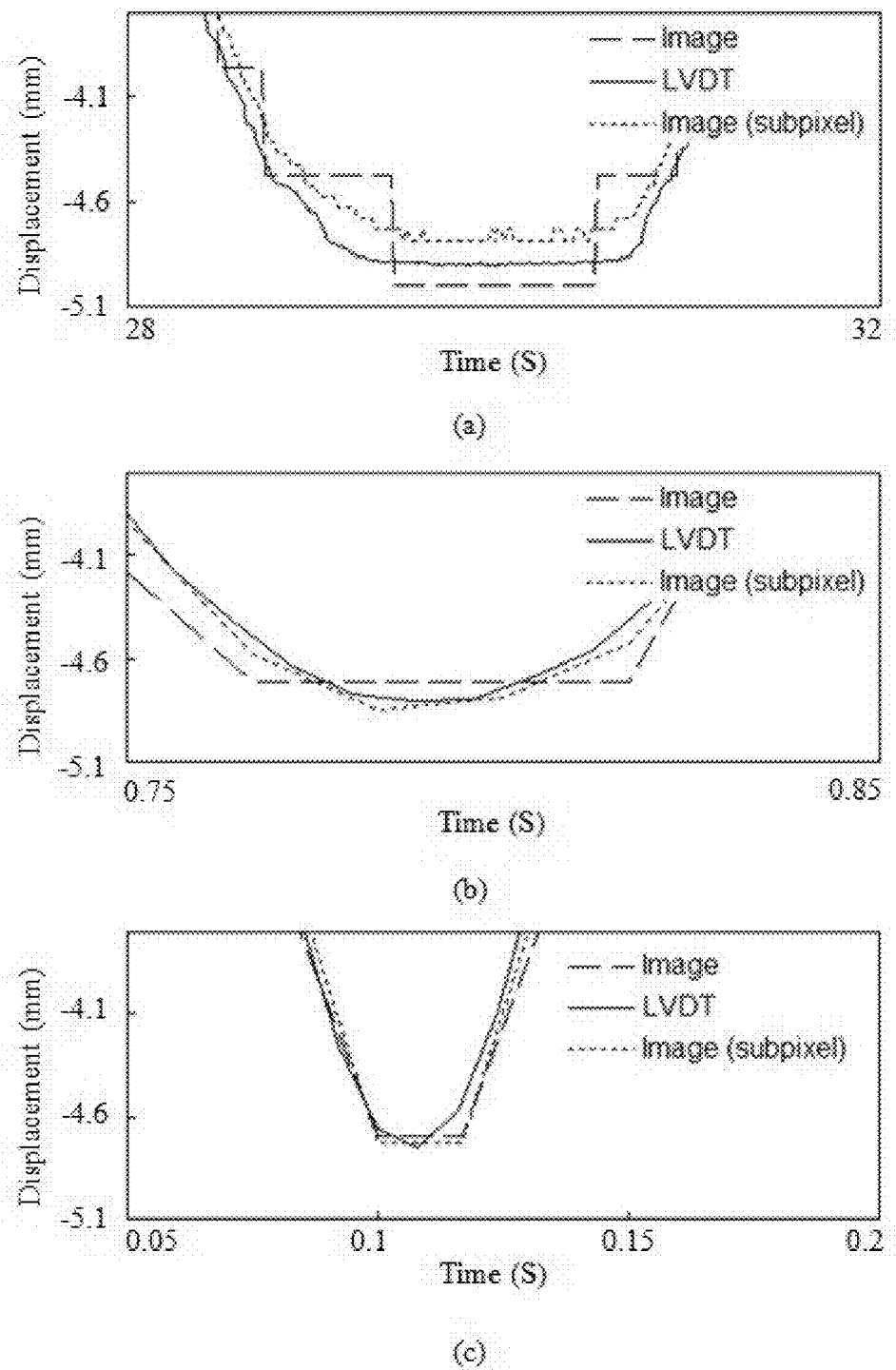
FIGS. 8A, 8B, and 8C are plots of displacement over time of an object vibrating at 1 Hz, 2.5 Hz, 5 Hz, respectively, measurement of which was performed in accordance with an exemplary embodiment of the disclosed subject matter.

The experiments runs were subsequently reanalyzed with the sub-pixel OCM technique described above. Plots comparing the displacement observed with this technique for each run are provided in FIGS. 8A-8C. As shown, the sub-pixel analysis agreed more closely with the linear variable differential transformer results.

Figure 9:
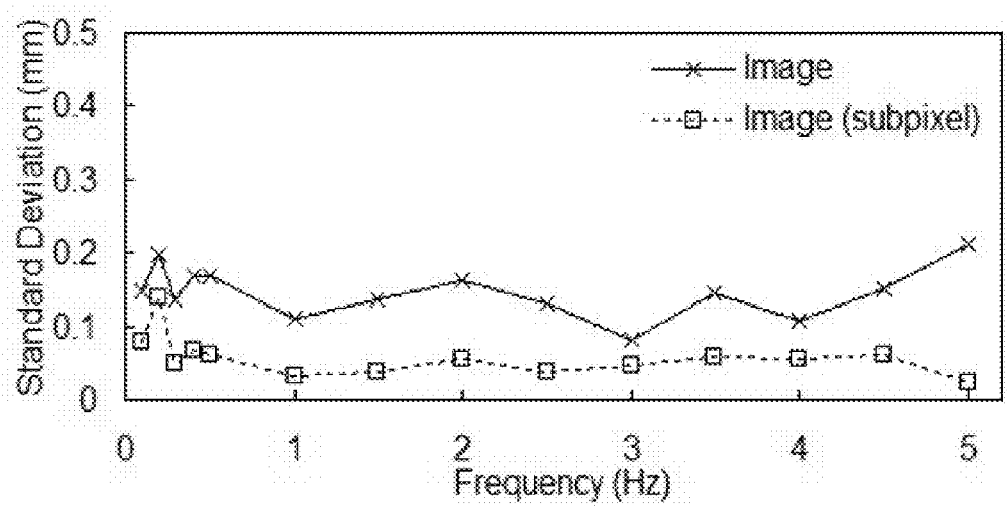
FIG. 9 is a plot of measurement errors observed during displacement measurement experiments conducted at various frequencies using exemplary embodiments of displacement measurement techniques in accordance with the disclosed subject matter.

FIG. 9 is a plot of the average standard deviations of measurement errors observed for the various experimental runs using the standard and sub-pixel OCM analyses. The maximum standard deviation of the error was 0.21 mm and the mean standard deviation of measurement error was 0.14 mm with the OCM algorithm. Using the sub-pixel OCM analysis, the average of the standard deviation of the measurement error was below 0.05 mm. For the earthquake recording experiment, the average standard deviation of the measurement error was 0.14 mm for the OCM analysis and 0.043 mm for the sub-pixel OCM analysis.

Example 2

Displacement of the Vincent Thomas Bridge, a 1500-ft long suspension bridge in California, was measured with and without use of a target panel. Two synchronized video cameras located at a stationary location 300 meters from the bridge were trained on the bridge, one focused on a pre-existing 800 mm×750 mm target panel having a random pattern of black and white squares, and the other focused on existing rivets and edges of the bridge adjacent the target panel. The cameras had a pixel density of 640×480 pixels and a frame rate of 60 frames per second.

Figure 10A:
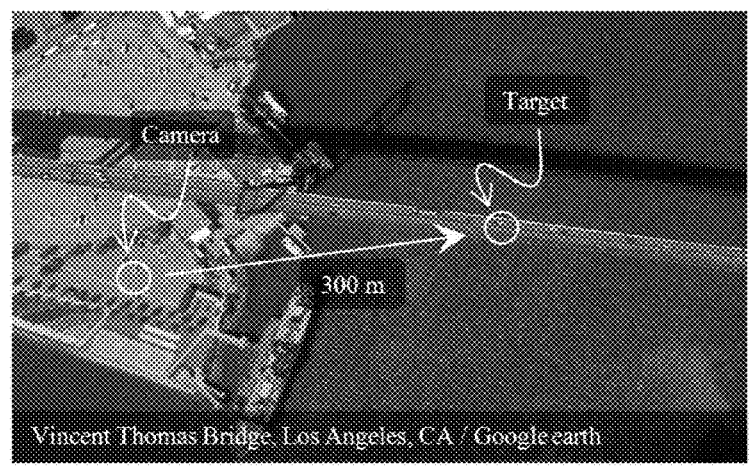
FIG. 10A is a satellite image of a structure observed according to an exemplary embodiment of the disclosed subject matter illustrating the location of the target and camera.
Figure 10B:
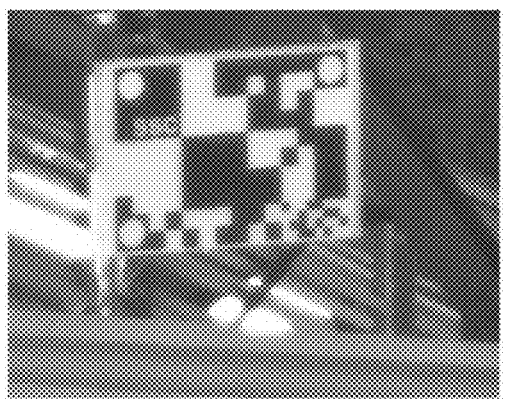
FIGS. 10B and 10C are images of a target panel and an external feature, displacement of which was measured in accordance with an exemplary embodiment of the disclosed subject matter.
Figure 10C:
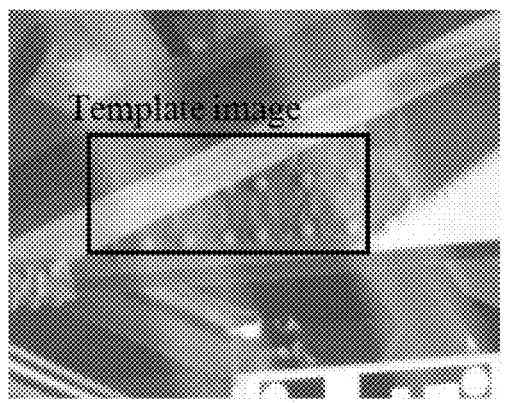
Figure 11:
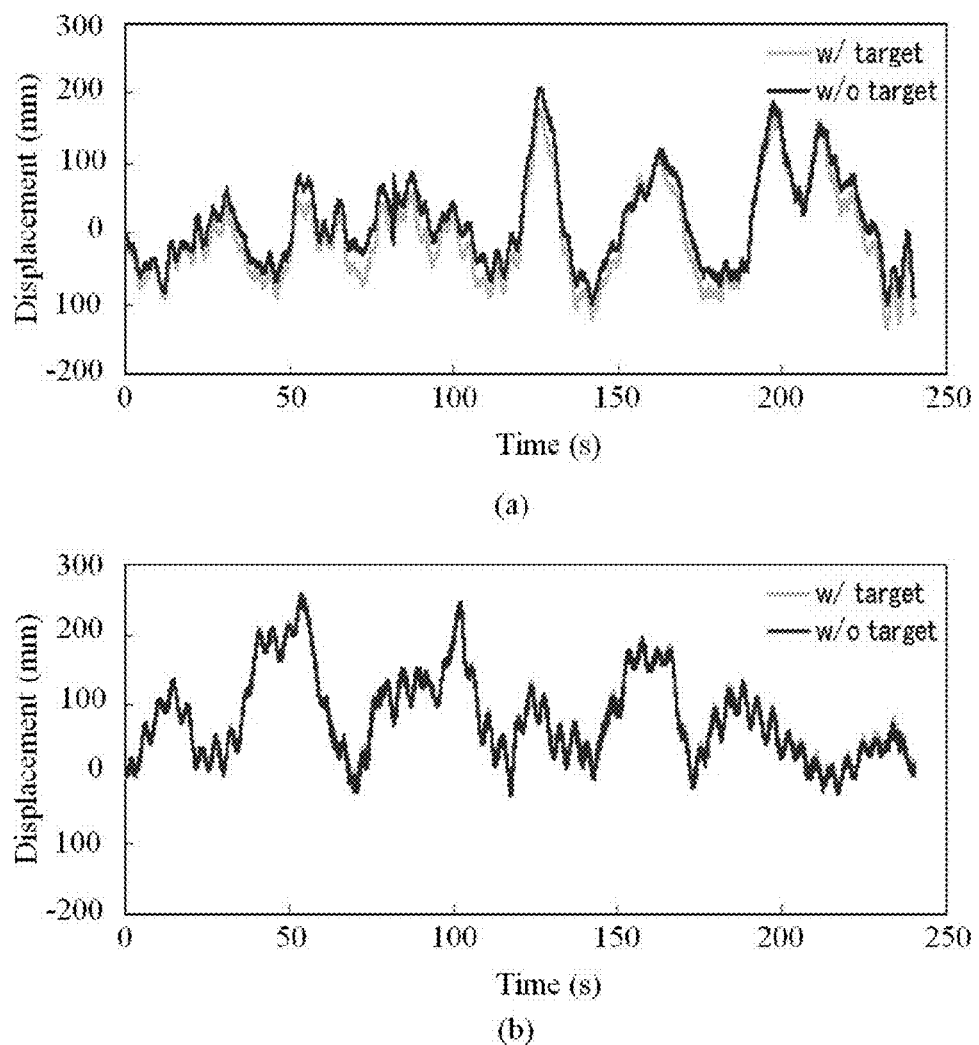
FIGS. 11A and 11B are plots of displacement over time of the target panel of FIG. 10B and the structural feature of FIG. 10C observed measured under high- and low-contrast conditions, respectively, with a technique in accordance with an exemplary embodiment of the disclosed subject matter.

The experimental setup is shown in FIG. 10A, and representative images of the target panel and rivets are shown in FIGS. 10B and 10C, respectively. The pixel size was calibrated using the target panel and calculated to be 3.01 mm. The bridge was recorded in the morning and again in the early evening; the Michelson contrast of the images recorded in the morning was measured to be 0.63, while the Michelson contrast of the images recorded in the morning was measured to be 0.36. Measurements of bridge displacement observed with and without a target panel are plotted in FIGS. 11A and 11B, respectively. There was close agreement between the observed displacements. The average standard deviation between the measurements was 6 mm.

Fourier transform was performed on the displacement time histories. Close agreement between target and rivet displacement was observed. A dominant frequency of 0.227 Hz was observed for the morning experiment, and a dominant frequency of 0.229 Hz was observed for the evening experiment. There was no difference in panel and rivet results after Fourier transform. The frequencies observed were consistent with the fundamental frequency of the bridge as measured by accelerometers.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the disclosed subject matter.

The invention claimed is:

1. A system for measuring a structural displacement of an object using one or more digital video cameras adapted to generate digital image information corresponding to two or more features of the object in a sequence of frames having a frame rate, one of the features being a substantially stationary feature and at least one of the features being a nonstationary feature, comprising:

an input to receive the digital image information corresponding to the two or more features;

a converter, coupled to the input, configured to convert each frame of the digital image information corresponding to the two or more features into a template; and a comparator, coupled to the converter, to compare the templates in sequence, the sequence being to compare a subsequent template against a previous template, and to subtract displacement of the substantially stationary feature to thereby measure spatial displacement of the at least one nonstationary feature over time based on at least a distance between the object and the one or more digital video cameras and a zoom ratio of the one or more digital video cameras, the comparator further configured to subtract from the displacement of the at least one nonstationary feature in the template the corresponding displacement of a substantially stationary reference feature in the template that occurs simultaneous to displacement of the at least one nonstationary features.

2. The system of claim 1, wherein at least one of the one or more digital video cameras has a zoom lens, and further comprising an auto-calibration module, coupled to the comparator, and including a laser distance meter, for measuring the distance between the one or more digital video cameras and the one or more features.

3. The system of claim 2, wherein the one or more digital video cameras having a zoom lens are configured to automatically zoom on the one or more features and to generate the corresponding zoom ratio, and wherein the zoom ratio is received by the comparator.

4. The system of claim 1, wherein the system comprises two or more digital video cameras, the two or more digital video cameras adapted to synchronously generate digital image information corresponding to the one or more features at a frame rate.

5. The system of claim 1, further comprising a stable housing structure for the one or more digital video cameras, wherein each of the one or more digital video cameras is housed within the stable housing structure.

6. The system of claim 4, further comprising a stable mounting structure for the two or more digital video cameras, wherein each of the two or more digital video cameras is mounted on the stable mounting structure.

7. A process for measuring a structural displacement of one or more nonstationary features of an object comprising:

generating, using one or more digital cameras, digital image information corresponding to the one or more nonstationary features of the object in a sequence of frames having a frame rate;

converting each frame of the digital image information into a template;

comparing, in sequence, each template to identify a displacement of the template, the sequence being to compare a subsequent template against a previous template;

subtracting displacement of the template that does not correspond to spatial displacement of the object, the subtracting further comprising subtracting from the displacement of one or more nonstationary features in the template the corresponding displacement of a substantially stationary reference feature in the template that occurs simultaneous to displacement of the one or more nonstationary features; and measuring, continuously over a period of time, based on at least a distance between the object and the one or more digital video cameras and a zoom ratio of the one or more digital video cameras, the displacement of the one or more nonstationary features.

8. The process of claim 7, further comprising:

measuring the distance between the one or more digital video cameras and the one or more nonstationary features of the object, the one or more digital video cameras further comprising a zoom lens;

determining the zoom ratio of the zoom lens of the one or more cameras; and calculating the spatial displacement of the object based on the displacement of the template.

9. The process of claim 7, wherein the digital image information is generated by two or more cameras and wherein the digital image information generated by each camera is synchronized.

10. A method for measuring a structural displacement of one or more nonstationary target features of an object comprising:

generating, in a sequence of frames having a frame rate, digital image information corresponding to the one or more nonstationary target features of the object and one or more substantially stationary reference features of the object using one or more digital cameras;

analyzing the digital image information corresponding to the one or more nonstationary features and the digital image information corresponding to the one or more stationary features with the aid of the processor configured to convert the each frame of the digital image information into a template, to compare each template in sequence, the sequence being to compare a subsequent template against a previous template, to subtract displacement of the substantially stationary reference feature, and to further subtract the displacement of one or more nonstationary target features in the template the corresponding displacement of one of the substantially stationary reference features in the template that occurs simultaneous to displacement of the one or more nonstationary features to thereby measure displacement of the one or more nonstationary features over time based on at least a distance between the object and the one or more digital video cameras and a zoom ratio of the one or more digital video cameras, the displacement of the one or more nonstationary features.

11. The method of claim 10, wherein the digital image information is generated using a single digital video camera configured to generate, in each frame, digital image information for both of one or more nonstationary target feature of the object and a substantially stationary reference feature of the object.

12. The method of claim 10, wherein the digital image information is generated by multiple digital video cameras, wherein at least one digital video camera is configured to generate digital image information for one or more nonstationary target features of the object and at least one digital video camera is configured to generate digital image information corresponding to the substantially stationary reference features of the object.

13. The method of claim 12, wherein each digital video camera is mounted on the same stable mounting structure.

* * * * *